Patented Feb. 10, 1948

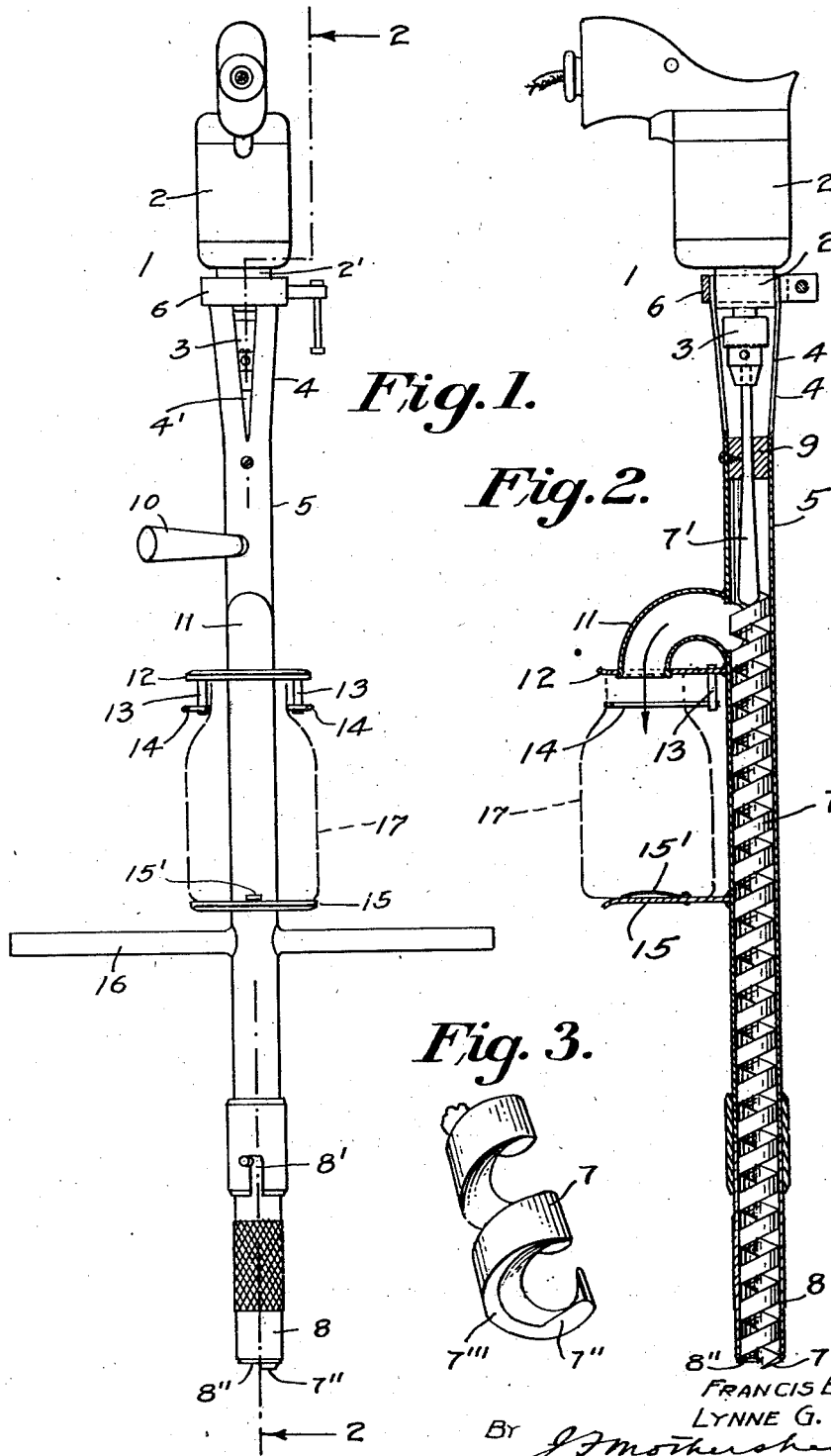

2,435,608

UNITED STATES PATENT OFFICE 2,435,608

DRILL SAMPLING DEVICE FOR FISH LIVERS

Francis Bruce Sanford and Lynne G. McKee, Seattle, Wash., assignors to the United States of America, as represented by the Secretary of the Interior Application October 22, 1945, Serial No. 623,840

3 Claims. (Cl. 73—425)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a "drill sampling device for fish livers," and has for its object to sample the livers and viscera of fish when in either a frozen or unfrozen state, in order that an estimate may be made of the vitamin A content thereof, as well as that of other valuable materials.

Nearly all of the fish livers brought in by fishermen were sold by them without the fishermen or purchasers having any knowledge of the true value of the livers. This condition existed because there was no practical way to estimate the vitamin A content of the livers by an inspection of them and because there was no simple method available whereby the livers could be conveniently sampled for subsequent chemical analysis of the vitamin A content. This led to confusion and resulted in loss either to the fisherman or to the purchaser.

The invention, therefore, consists of the novel construction and arrangement of parts of a fish liver sampling device, which is simple in construction, convenient and easy of operation, entirely efficient in use and which is composed of a minimum number of parts, all of which will be first fully described and afterwards specifically pointed out in the appended claims:

Referring to the accompanying drawing:

Figure 1 is a front elevation of the device.

Figure 2 is a vertical sectional view taken on line 2—2 of Figure 1, the electric drill, chuck and auger being shown in elevation, and Figure 3 is an enlarged fragmentary elevation of the cutting end of the auger bit.

Like numerals of reference indicate the same parts throughout the three figures, in which:

I indicates the sampling device assembly which includes a conventional electric hand drill 2 and chuck 3, a cylindrical housing 2' for the hand drill 2, to which the upper end 4 of the drill tube 5 is removably attached by a clamp 6. The device also includes an auger drill or bit 7 which is chucked in the chuck 3 within the casing 5 and a removable tip 8 for the drill casing.

Referring to the assembly in more detail, it will be seen that the upper end 4 of the drill tube 5 is flared so as to enclose the drill chuck 3 and the extreme end portion of said flared end is slit at 4', so as to be compressed into intimate engagement with the cylindrical end 2' of the housing of the electric drill 2 by the clamp 6. Any suitable band clamp may be employed for the purpose of clamping the drill tube 5 in operative position on the casing of the electric drill 2.

It will also be seen from Figure 2 that the auger bit or drill 7 has its shank 7' tapered to a final cylindrical formation for chucking in the drill chuck 3 of the electric drill 2, while the form of the auger or drill 7 preferred is of the ship auger type with single spiral and cutting edge and without a screw.

In the preferred form, the cutting edge 7" projects well ahead of the heel, and this is accomplished by grinding back the heel in the manner as illustrated at 7''' in Figure 3, so that the heel recedes rapidly from the cutting edge 7". This prevents the liver material from being held away from the cutting edge 7" and allows the cutting edge to properly enter the material for efficient cutting of the liver fibres and prevent them from winding around the auger.

Referring again to the drill or auger casing 5, it will be seen that the tip 8 of the casing 5 is removably connected to the body of the casing 5 by a bayonet joint 8' and is of such length that the cutting edge 7" of the auger 7 projects sufficiently below the end 8" of the tip 8 to insure efficient cutting action of the said cutting edge 7".

Since the drill or auger casing 5 with its tip 8 must progress into the liver material along with the auger, the end 8" of the tip 8 is preferably case-hardened and ground to a sharp cutting edge, so as to cut through the liver material as it progresses into it. By removal of the tip 8, the cutting edge 7" of the auger 7 may easily be freed of any liver fibres which may have become packed in or around the auger 7 at its lower portion.

Arranged in the upper portion of the drill or auger casing 5 is a wooden plug 9 centrally bored to permit entrance of the cylindrical chucking end of the auger through the plug, as shown in Figure 2. The purpose of this plug 9 is to prevent possible passage of the liver material into the drill chuck 3 and to confine the material in the drill casing 5 and below the flared portion thereof for the purpose which will be presently described.

Attached to the drill casing 5 near the upper end thereof is a handle 10, so that the operator may properly position and guide the device in operation with one hand and grasp the handle of the electric drill with the other.

Also attached to and connecting with the interior of the drill casing 5, at a point below the handle 10, and opposite to the last convolutions of the spiral auger bit 7, is a delivery spout 11, while directly under the mouth of said spout 11 is a horizontally arranged plate 12. Depending from said plate 12 are two posts 13 which support two spring wire clips 14. Somewhat below the plate 12, a support 15 extends outwardly from the drill casing 5, which support 15 is preferably provided with a flat leaf spring 15', as shown in Figure 2.

Arranged on the drill casing 5 below the support 15 and extending horizontally from opposite sides thereof is a guard 16 which limits the entrance of the auger into the liver material, which when packed in a container of standard depth, prevents the auger from contacting the bottom of the container, so as to protect the cutting edge of the auger.

Having thus described the several parts of the device, the operation is as follows:

A container, such as a fruit jar 17, is placed on the support 15, the spring clips 14 embracing the threaded neck thereof and the leaf spring 15' on the support 15 pressing the mouth of the container into intimate contact with the underface of the plate 12. The end of the drill casing 5 and the cutting edge 7'' is positioned on the fish livers, and both are progressed into the fish livers upon rotation of the auger 7 by the electric drill 2. The auger fits closely the bore of the drill casing 5, so that as the auger cuts into the fish livers, the material which is removed is conveyed upwardly through the auger casing 5 by the spiral convolutions of the auger 7. The wooden plug 9 in the upper portion of the auger casing 5 stops the upward progress of the liver material and as it is fed upwardly by the auger 7, it is forced out of the auger casing 5 through the spout 11 and into the container 17 positioned thereunder. The container 17 with the liver material therein is then removed from the device and subsequently subjected to the laboratory tests necessary to determine the value of the vitamin A content of the sample of the material so obtained.

Having thus described the invention and its operation, we do not wish to be understood as limiting ourselves to the exact construction as herein described and shown in the accompanying drawing, but consider ourselves clearly entitled to all such changes and modifications as fall within the limit and scope of the appended claims.

We claim:

1. A drill sampling device for fish livers which includes, in combination with a conventional electric hand drill and chuck, an auger tube and means for connecting the auger tube to the housing of the hand drill, an auger closely fitting within the auger tube but rotatable therein, a centrally bored plug in the upper portion of the auger tube through which the shank of the auger passes for chucking in the chuck of the hand drill, a removable tip on the lower end of the auger tube, the end of the tip being provided with a sharp cutting edge, said sharp cutting edge being positioned slightly above the cutting edge of the auger, a delivery spout near the upper end of the auger tube and below the said plug therein, means mounted on the auger tube for supporting a receptacle under the delivery spout and a guard on the auger tube to limit the entrance of the auger and tube in the fish livers, the whole arranged whereby the liver material cut from the fish by the auger is conveyed by the spiral convolutions of the auger upwardly within the auger tube and expelled therefrom through the said delivery spout into a receptacle.

2. A drill sampling device for fish livers which includes, in combination with a conventional electric hand drill and chuck, an auger tube and means for connecting the auger tube to the housing of the hand drill, an auger having a shank for connection with the chuck of the hand drill, said auger closely fitting within the auger tube but rotatable therein, a removable tip on the lower end of the auger tube, the end of the tip being provided with a sharp cutting edge, the cutting edge of the auger extending slightly below the sharp cutting edge of the auger tube, a delivery spout near the upper end of the auger tube, and means mounted on the auger tube for supporting a receptacle under the delivery spout, the whole arranged whereby the liver material cut from the fish livers by the auger is conveyed by the spiral convolutions of the auger upwardly within the auger tube and expelled therefrom through the said delivery spout into a receptacle.

3. A drill sampling implement for fish livers which includes, in combination with a conventional hand drill and chuck, a stationary auger tube and means for connecting the auger tube to the housing of the hand drill, an auger having a shank for connection with the chuck of the hand drill, said auger closely fitting within the stationary auger tube and rotatable therein, the lower end of the auger tube having a sharp cutting edge, whereby there is provided a stationary sharp cutting edge and a rotatable sharp cutting edge for the implement coacting together to facilitate the entrance of the implement into a fish liver, the cutting edge of the auger tube being positioned slightly above the cutting edge of the auger and a delivery spout near the upper end of the auger tube, the whole arranged whereby the liver material cut from a fish liver by the combined cutting action of the stationary auger tube and the rotary cutting action of the auger is conveyed by the spiral convolutions of the auger upwardly within the auger tube to the said delivery spout.

FRANCIS BRUCE SANFORD.
LYNNE G. McKEE.

REFERENCES CITED

The following references are of record in the file of this patent:

UNITED STATES PATENTS

| Number | Name | Date |
|---|---|---|
| 1,927,871 | Irwin, et al. | Sept. 26, 1933 |
| 2,108,195 | Crow | Feb. 15, 1938 |
| 2,301,478 | Tibbals, Jr., et al. | Nov. 10, 1942 |